(12) United States Patent
Modi et al.

(10) Patent No.: US 10,818,312 B2
(45) Date of Patent: Oct. 27, 2020

(54) AFFECT-DRIVEN DIALOG GENERATION

(71) Applicant: Disney Enterprises, Inc., Burbank, CA (US)

(72) Inventors: Ashutosh Modi, Glendale, CA (US); Mubbasir Kapadia, Baden (CH); Douglas A. Fidaleo, Canyon Country, CA (US); James R. Kennedy, Glendale, CA (US); Wojciech Witon, Warsaw (PL); Pierre Colombo, Paris (FR)

(73) Assignee: Disney Enterprises, Inc., Burbank, CA (US)

( * ) Notice: Subject to any disclaimer, the term of this patent is extended or adjusted under 35 U.S.C. 154(b) by 91 days.

(21) Appl. No.: 16/226,166

(22) Filed: Dec. 19, 2018

(65) Prior Publication Data

US 2020/0202887 A1 Jun. 25, 2020

(51) Int. Cl.
*G10L 25/63* (2013.01)
*G10L 15/22* (2006.01)
(Continued)

(52) U.S. Cl.
CPC ............... *G10L 25/63* (2013.01); *G06N 3/04* (2013.01); *G10L 15/063* (2013.01); *G10L 15/22* (2013.01);
(Continued)

(58) Field of Classification Search
CPC ......... G10L 25/63; G10L 15/22; G10L 15/18; G10L 15/28; G10L 15/063;
(Continued)

(56) References Cited

U.S. PATENT DOCUMENTS

2019/0385051 A1* 12/2019 Wabgaonkar ....... G06F 16/3329

FOREIGN PATENT DOCUMENTS

CN 108563628 A * 9/2018
CN 108829662 A * 11/2018

OTHER PUBLICATIONS

Huang, Chenyang, et al. "Automatic Dialogue Generation with Expressed Emotions." Proceedings of the 2018 Conference of the North American Chapter of the Association for Computational Linguistics: Human Language Technologies, vol. 2 (Short Papers). vol. pp. 49-54.
(Continued)

*Primary Examiner* — Yogeshkumar Patel
(74) *Attorney, Agent, or Firm* — Farjami & Farjami LLP

(57) ABSTRACT

According to one implementation, an affect-driven dialog generation system includes a computing platform having a hardware processor and a system memory storing a software code including a sequence-to-sequence (seq2seq) architecture trained using a loss function having an affective regularizer term based on a difference in emotional content between a target dialog response and a dialog sequence determined by the seq2seq architecture during training. The hardware processor executes the software code to receive an input dialog sequence, and to use the seq2seq architecture to generate emotionally diverse dialog responses based on the input dialog sequence and a predetermined target emotion. The hardware processor further executes the software code to determine, using the seq2seq architecture, a final dialog sequence responsive to the input dialog sequence based on an emotional relevance of each of the emotionally diverse dialog responses, and to provide the final dialog sequence as an output.

20 Claims, 4 Drawing Sheets

(51) Int. Cl.
*G10L 15/28* (2013.01)
*G06N 3/04* (2006.01)
*G10L 15/06* (2013.01)

(52) U.S. Cl.
CPC ...... *G10L 15/28* (2013.01); *G10L 2015/0635* (2013.01); *G10L 2015/225* (2013.01)

(58) Field of Classification Search
CPC ...... G10L 2015/0635; G10L 2015/225; G06N 3/0445; G06N 3/0454; G06N 3/0472; G06N 3/02; G06N 3/04; G06N 3/088
See application file for complete search history.

(56) References Cited

OTHER PUBLICATIONS

Zhou, Hao, et al. "Emotional chatting machine: Emotional conversation generation with internal and external memory." arXiv preprint arXiv:1704.01074 (2017). pp. 1-9.

Mehrabian, Albert. "Pleasure-arousal-dominance: A general framework for describing and measuring individual differences in temperament." Current Psychology 14.4 (1996): 261-292. pp. 1-2.

Sutskever, Ilya, Oriol Vinyals, and Quoc V. Le. "Sequence to sequence learning with neural networks." Advances in neural information processing systems. 2014. pp. 1-9.

\* cited by examiner

AFFECT-DRIVEN DIALOG GENERATION

BACKGROUND

Advances in deep learning techniques have had a significant impact on end-to-end conversational systems. Most of the present research in this area focuses primarily on the functional aspects of conversational systems, such as keyword extraction, natural language understanding, and the logical pertinence of generated responses. As a result, conventional conversational systems are typically designed and trained to generate grammatically correct, logically coherent responses relative to input prompts. Although proper grammar and logical coherency are necessary qualities for dialog generated by a conversational system, most existing systems fail to express social intelligence. Consequently, there is a need in the art for affect-driven dialog generation solutions for producing responses expressing emotion in a controlled manner, without sacrificing grammatical correctness or logical coherence.

SUMMARY

There are provided systems and methods for performing affect-driven dialog generation, substantially as shown in and/or described in connection with at least one of the figures, and as set forth more completely in the claims.

DETAILED DESCRIPTION

Figure 1:
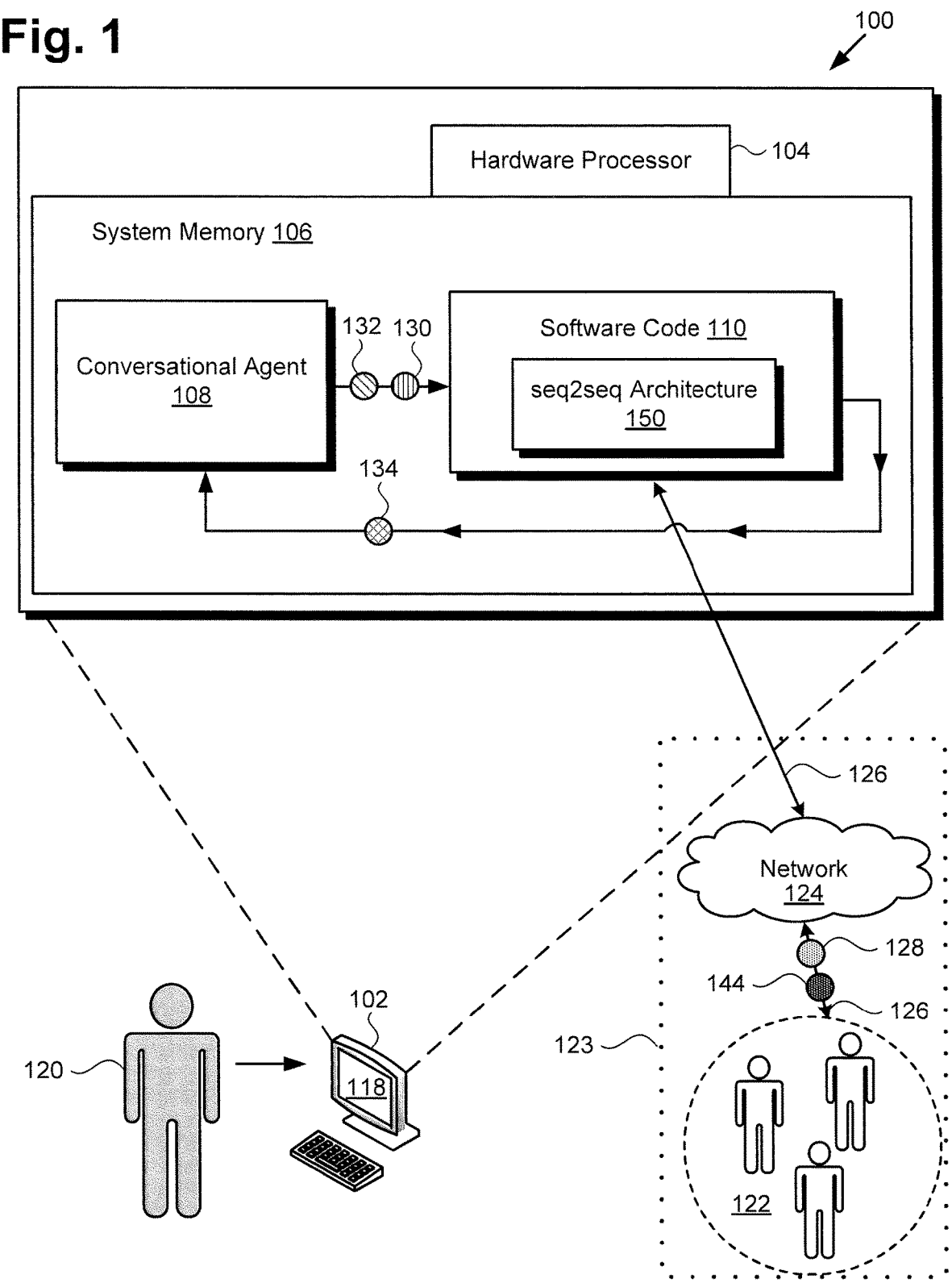
FIG. 1 shows a diagram of an exemplary affect-driven dialog generation system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses affect-driven dialog generation systems and methods that overcome the drawbacks and deficiencies in the conventional art. The present solution does so at least in part by utilizing a sequence-to-sequence architecture (hereinafter "seq2seq architecture") to generate emotionally diverse dialog responses to an input dialog sequence. The present application discloses a novel and inventive seq2seq architecture including an affective re-ranking stage, in addition to an encoder and decoder.

It is noted that, as defined in the present application, the expression "affect-driven dialog generation" refers to a dialog generation approach that includes a socially intelligent emotionally responsive component, as well as components addressing grammar and pertinence. Thus, the dialog sequences generated using an "affect driven" approach express emotions that are relevant to an interaction supported by the dialog sequences, as well as being grammatically correct and logically coherent relative to that interaction.

It is also noted that, as used herein, the feature "conversational agent" refers to a non-human interactive interface implemented using hardware and software, and configured to autonomously acquire and consolidate dialog knowledge so as to enable the conversational agent to engage in extended social interactions. A conversational agent may be utilized to animate a virtual character, such as an avatar, or a machine, such as a robot, automated voice response (AVR) system, or an interactive voice response (IVR) system, for example.

FIG. 1 shows a diagram of an exemplary affect-driven dialog generation system, according to one implementation. As shown in FIG. 1, affect-driven dialog generation system 100 includes computing platform 102 having hardware processor 104, system memory 106 implemented as a non-transitory storage device, and display 118. According to the present exemplary implementation, system memory 106 stores non-human conversational agent 108 and software code 110 including seq2seq architecture 150.

As further shown in FIG. 1, affect-driven dialog generation system 100 is implemented within a use environment including communication network 124, user 120 of computing platform 102, and one or more human annotators 122 participating in training phase 123 of seq2seq architecture 150. In addition, FIG. 1 shows network communication links 126 interactively connecting computing platform 102 and one or more human annotators 122 via communication network 124 during training phase 123. Also shown in FIG. 1 are input dialog sequence 130 to software code 110, predetermined target emotion 132, dialog sequence 128 determined by seq2seq architecture 150 during training phase 123, training input 144 provided by one or more human annotators 122 during training phase 123, and final dialog sequence 134 determined by software code 110 using seq2seq architecture 150.

It is noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts non-human conversational agent 108 and software code 110 as being stored together in system memory 106, that representation is also provided merely as an aid to conceptual clarity. More generally, affect-driven dialog generation system 100 may include one or more computing platforms 102, such as desk top computers, laptop computers, computer servers, or mobile communication devices such as smartphones or tablet computers, for example, which may be co-located, or may form an interactively linked but distributed system, such as a cloud based system or a peer-to-peer (P2P) networked system, for instance.

As a result, hardware processor 104 and system memory 106 may correspond to distributed processor and memory resources within affect-driven dialog generation system 100. Thus, it is to be understood that non-human conversational agent 108 and software code 110 may be stored remotely from one another and/or may be executed using the distributed processor resources of affect-driven dialog generation system 100.

According to some implementations, user 120 may interact with computing platform 102 to utilize software code 110 to train seq2seq architecture 150 to perform affect-driven dialog generation. Alternatively, or in addition, user 120 may utilize computing platform 102 to interact with non-human conversational agent 108 supported by software code 110 including seq2seq architecture 150.

It is noted that, during training of seq2seq architecture 150, dialog sequence 128 determined by seq2seq architecture 150 of software code 110 may be reviewed and/or corrected by one or more annotators 122 using training input 144. One or more annotators 122 may be remote from one another, as well as remote from computing platform 102, and may be in communication with computing platform 102 via communication network 124, which may be a packet-switched network such as the Internet, for example.

After completion of training, i.e., when software code 110 utilizes seq2seq architecture 150 to perform affect-driven dialog generation substantially autonomously, software code 110 is configured to receive input sequence 130 and predetermined emotion 132 from non-human conversational agent 108 or another source external to software code 110, and to generate final dialog sequence 134 in response. In various implementations, final dialog sequence 134, when provided as an output by software code 110 including seq2seq architecture 150, may be stored in system memory 106 and/or may be copied to non-volatile storage. Alternatively, or in addition, in some implementations, final dialog sequence 134 may be rendered by non-human conversational agent 108, for example by being rendered as text on display 118 or rendered as verbal communications by a virtual character rendered on display 118. It is noted that display 118 may be implemented as a liquid crystal display (LCD), a light-emitting diode (LED) display, an organic light-emitting diode (OLED) display, or another suitable display screen that performs a physical transformation of signals to light.

Figure 2:
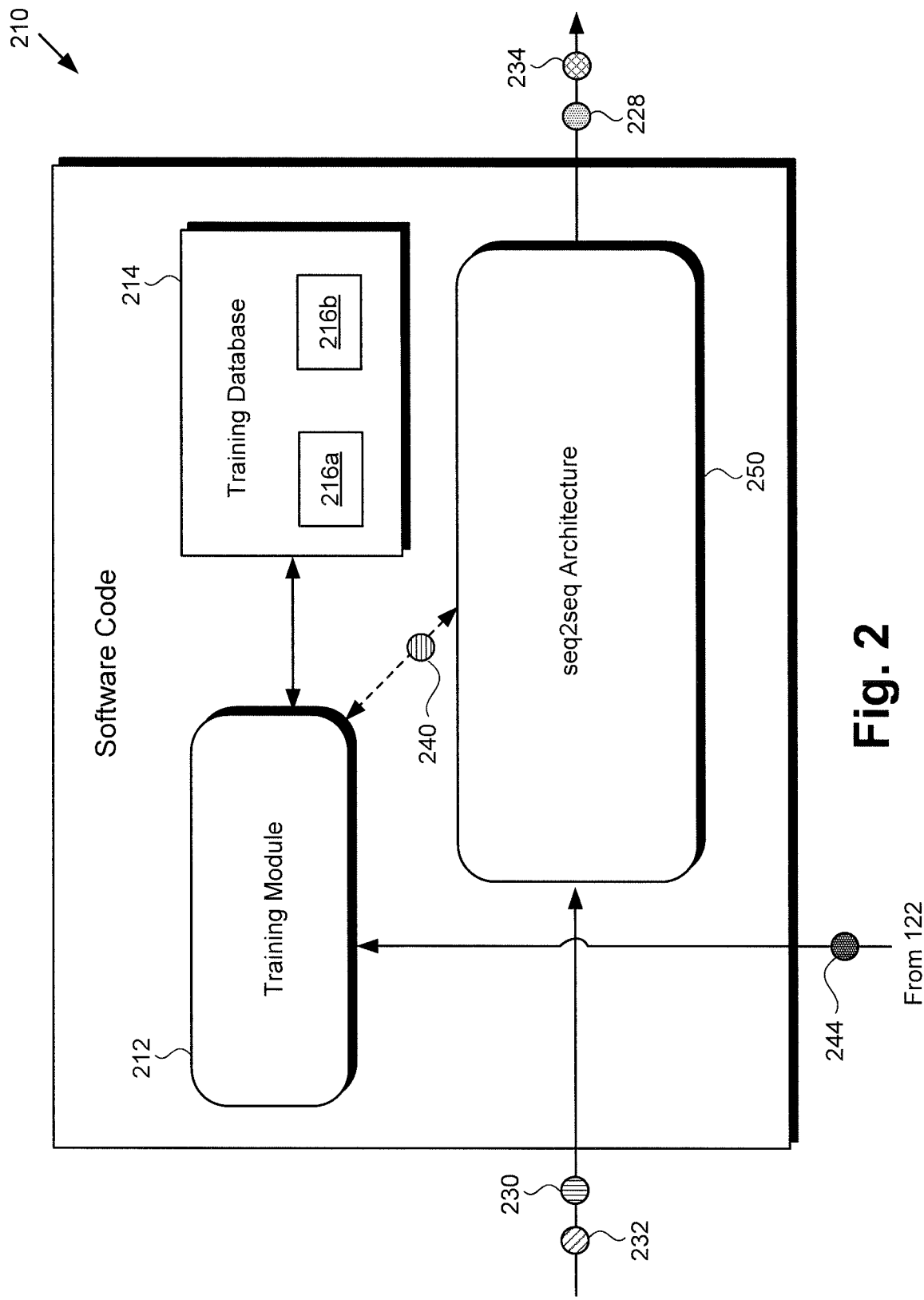
FIG. 2 shows an exemplary diagram of a software code suitable for execution by a hardware processor of the affect-driven dialog generation system shown by FIG. 1, according to one implementation.

FIG. 2 shows exemplary software code 210 suitable for execution by hardware processor 104 of computing platform 102, in FIG. 1, according to one implementation. As shown in FIG. 2, software code 210 may include seq2seq architecture 250. In addition, FIG. 2 shows input dialog sequence 230 and predetermined target emotion 232, as well as dialog sequence 228 determined during training by seq2seq architecture 250, training input 244 received from one or more annotators 122 during training phase 123, and final dialog sequence 234. As further shown in FIG. 2, software code 210 can include training module 212 and training database 214 storing training datasets 216a and 216b. Also shown in FIG. 2 is training target dialog response 240 provided to seq2seq architecture 250 by training module 212 during the training phase.

Input dialog sequence 230, predetermined target emotion 232, dialog sequence 228 determined during training, training input 244, and final dialog sequence 234 correspond respectively in general to input dialog sequence 130, predetermined target emotion 132, dialog sequence 128 determined during training, training input 144, and final dialog sequence 134, in FIG. 1. In other words, input dialog sequence 230, predetermined target emotion 232, dialog sequence 228 determined during training, training input 244, and final dialog sequence 234 may share any of the characteristics attributed to respectively corresponding input dialog sequence 130, predetermined target emotion 132, dialog sequence 128 determined during training, training input 144, and final dialog sequence 134 by the present disclosure, and vice versa.

In addition, software code 210 including seq2seq architecture 250 corresponds in general to software code 110 including seq2seq architecture 150, and those corresponding features may share the characteristics attributed to either corresponding feature by the present disclosure. That is to say, like software code 210, software code 110 may include features corresponding respectively to training module 212 configured to provide training target dialog response 240, and training database 214 storing training datasets 216a and 216b.

Figure 3:
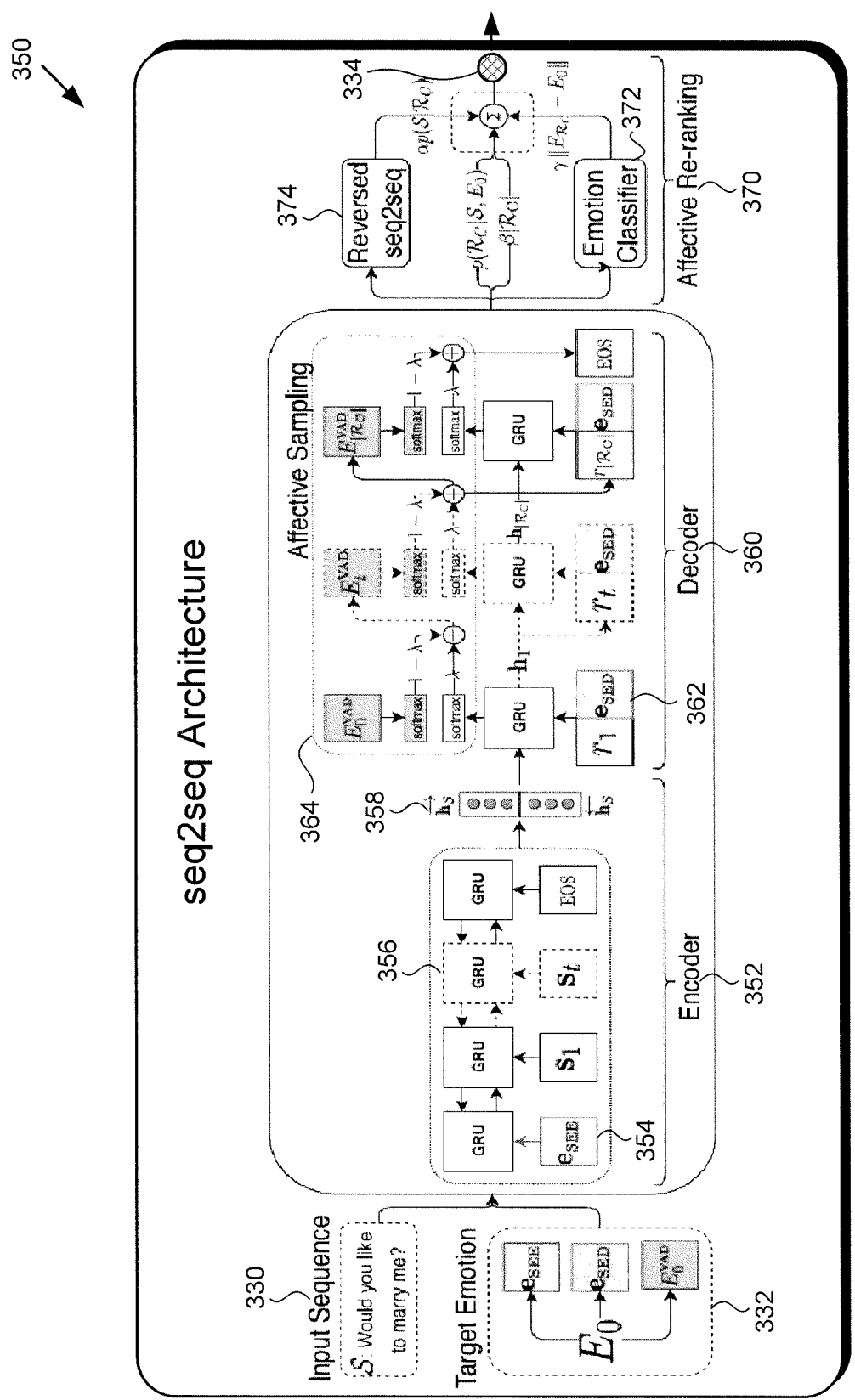
FIG. 3 shows a diagram of an exemplary sequence-to-sequence architecture included in the software code of FIGS. 1 and 2, according to one implementation.

FIG. 3 shows a diagram of exemplary seq2seq architecture 350, according to one implementation. It is noted that seq2seq architecture 350, in FIG. 3, is a specific exemplary implementation of seq2seq architecture 150/250, in FIGS. 1 and 2, and corresponds in general to those features. Consequently, each of seq2seq architecture 150/250/350 can share the features attributed to any of seq2seq architecture 150/250/350 by the present disclosure. Also shown in FIG. 3 are input dialog sequence 330, predetermined target emotion 332, and final dialog sequence 334 corresponding respectively to input dialog sequence 130/230, predetermined target emotion 132/232, and final dialog sequence 134/234 in FIGS. 1 and 2.

As shown in FIG. 3, seq2seq architecture 150/250/350 can include encoder 352, decoder 360, and affective re-ranking stage 370. Encoder 352 may be implemented using a recurrent neural network (RNN) or a convolutional neural network (CNN), for example. According to the exemplary implementation shown in FIG. 3, encoder 352 includes emotion embedding $e_{SEE}$ 354 provided by a Sequence-Level Encoder Model (SEE), and multiple instances of a Gated Recurrent Unit (GRU) represented by exemplary GRU 356 in FIG. 3. Encoder 352 is configured to determine vector representation $h_S$ 358 of input dialog sequence 130/230/330. Decoder 360 may also be implemented using an RNN or a CNN. According to the exemplary implementation shown in FIG. 3, decoder 360 includes multiple instances of emotion embedding $e_{SED}$ provided by a Sequence-Level Decoder Model (SED) and represented by exemplary $e_{SED}$ 362, as well as affective sampling block 364. As further shown in FIG. 3, affective re-ranking stage 370 includes emotion classifier 372 and reversed seq2seq block 374.

Figure 4:
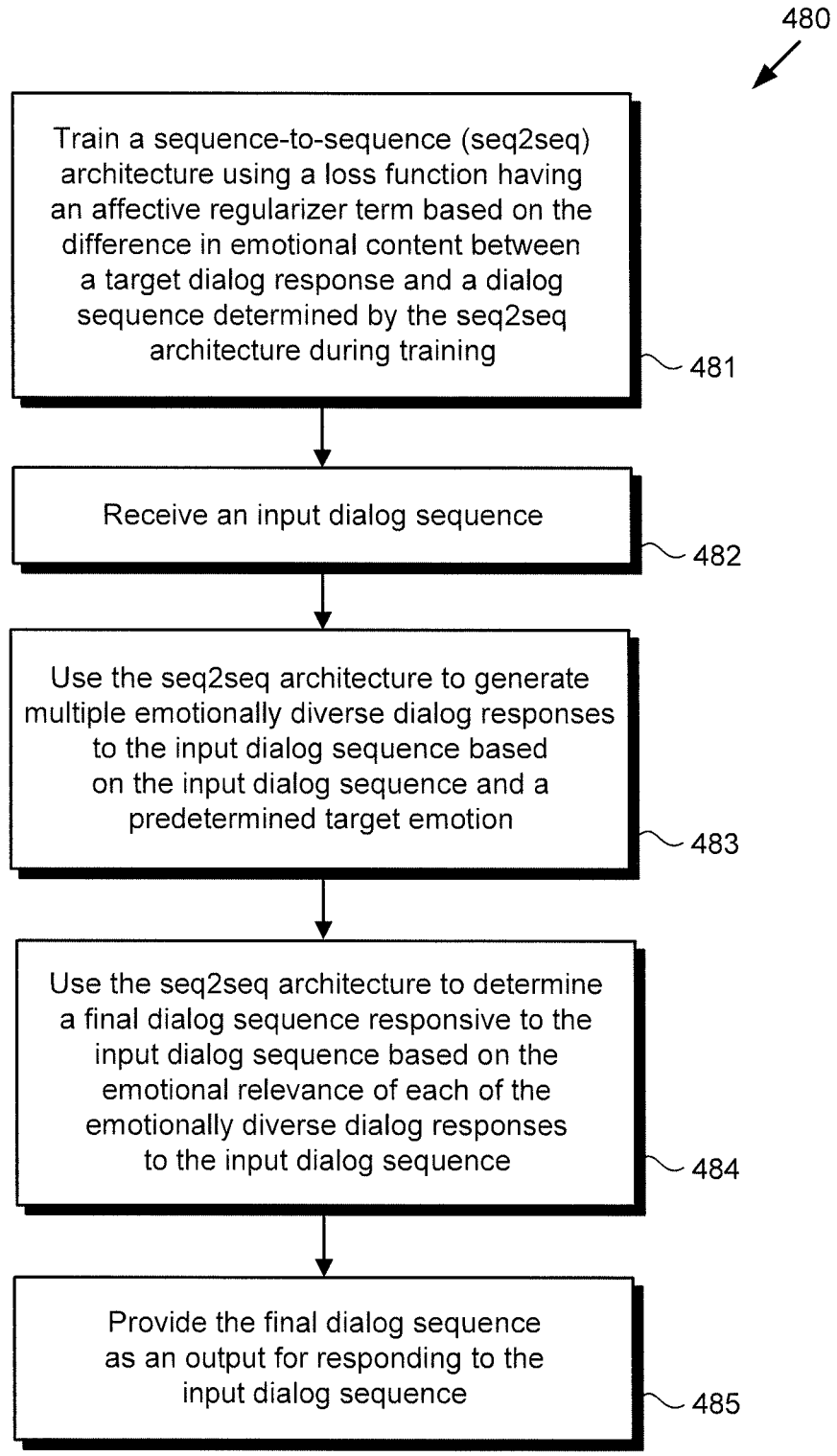
FIG. 4 shows a flowchart presenting an exemplary method for performing affect-driven dialog generation, according to one implementation.

The functionality of software code 110/210 and seq2seq architecture 150/250/350 will be further described by reference to FIG. 4 in combination with FIGS. 1, 2, and 3. FIG. 4 shows flowchart 480 presenting an exemplary method for performing affect-driven dialog generation, according to one implementation. With respect to the method outlined in FIG. 4, it is noted that certain details and features have been left out of flowchart 480 in order not to obscure the discussion of the inventive features in the present application.

As a preliminary matter, $V=\{w_1, w_2, \ldots, w_{|V|}\}$ is defined to be a vocabulary, while $X=(x_1, x_2, \ldots, x_{|x|})$ is defined to be a sequence of words. In addition, $E_X \in \mathbb{R}^6$ is denoted as an emotion vector representing a probability distribution over six emotions associated with the sequence of words X as:

$$E_X = [p_{anger}, p_{surprise}, p_{joy}, p_{sadness}, p_{fear}, p_{disgust}] \quad \text{(Equation 1)}$$

It is noted that x can be an input dialog sequence S corresponding to input dialog sequence 130/230/330, a candidate response $R_C$, a final response $R_{final}$ corresponding to final dialog sequence 134/234/334, or a target dialog response $R_0$ corresponding to target dialog response 240. Also utilized is $E_0$, which, during training of seq2seq architecture 150/250/350 is the representation of the emotion of target dialog response $R_0$ 240. Once seq2seq architecture 150/250/350 is trained, $E_0$ indicates predetermined target emotion 132/232/332 for final dialog sequence $R_{final}$ 134/234/334.

The present novel and inventive approach to performing affect-driven dialog generation utilizes a sequence-to-sequence architecture that is significantly distinguishable over conventional sequence-to-sequence models. For example, the sequence-to-sequence architecture utilized according to the present inventive concepts includes seq2seq architecture 150/250/350 implemented using a sequence-to-sequence architecture including encoder 352, decoder 360, and affective re-ranking stage 370 configured to determine the emotional relevance of each of multiple emotionally diverse dialog responses $R_C$ to input dialog sequence S 130/230/330.

According to a conventional sequence-to-sequence model having an encoder and a decoder but no feature corresponding to affective re-ranking stage 370, the encoder computes vector representation $h_S$ for source sequence S, while the decoder generates one word at a time, and computes the conditional probability of a candidate response, $R_C$, as:

$$\log p(R_C|S) = \Sigma_{t=1}^{|R_C|} \log p(r_t|r_{<t}, h_S) \quad \text{(Equation 2)}$$

$$p(r_t|r_{<t}, h_S) = \text{softmax } g(h_t), \quad \text{(Equation 3)}$$

where $g(h_t)$ is a linear mapping from GRU hidden state $h_t = f(h_{t-1}, r_{t-1})$ to an output vector of size $|V|$, and $r_{t-1}$ is an input to the decoder at time t. To generate $R_{final}$ the conventional sequence-to-sequence approach uses the following objective function:

$$R_{final} = \text{argmax}_{R_C} p(R_C|S), \quad \text{(Equation 4)}$$

The present approach to performing affect-driven dialog generation extends the conventional sequence-to-sequence architecture by including emotion-specific information during training and the inference process. A significant challenge for generating and evaluating affect-driven dialog responses is a reliable assessment of emotional state. The present exemplary approach uses two representations of emotion. The first representation of emotions is categorical, and uses the six emotions addressed by Equation 1, i.e., anger, surprise, joy, sadness, fear, and disgust. The second representation is continuous in a Valence-Arousal-Dominance (VAD) mood space known in the art. In one implementation, the second, continuous, representation of emotion uses a VAD lexicon introduced by S. M. Mohammad and also known in the art, where each of twenty thousand words is mapped to a three-dimensional (3D) vector of VAD values, ranging from zero (lowest) to one (highest), i.e., $v \in [0,1]^3$. It is noted that Valence measures positivity/negativity, Arousal measures excitement/calmness, and Dominance measures powerfulness/weakness of an emotion or word.

Referring now to FIG. 4 in combination with FIGS. 1, 2, and 3, flowchart 480 begins with training seq2seq architecture 150/250/350 using a loss function having an affective regularizer term based on the difference in emotional content between target dialog response 240 and a dialog response determined by seq2seq architecture 150/250/350 during training (action 481). Seq2seq architecture 150/250/350 may be trained using software code 110/210, executed by hardware processor 104, and using training module 212 and training database 214, as described below.

Affective training requires $E_0$, the emotion representation of target dialog response $R_0$ 240. In order to label all sentences of datasets 216a and 216b with $E_0$, emotion classifier 372 is utilized. Emotion classifier 372 is configured to predict a probability distribution over each of the six classes of emotions identified above in Equation 1, i.e., anger, surprise, joy, sadness, fear, and disgust.

According to the present affect-driven dialog generation approach, training of seq2seq architecture 150/250/350 aims to generate the final training dialog sequence $R_{final}$ expressing emotions encoded in $E_0$, using the following objective function in lieu of Equation 4, above, utilized in the conventional art:

$$R_{final} = \text{argmax}_{R_C} p(R_C|S, E_0) \quad \text{(Equation 5)}$$

Discussed below are four different affective training procedures modeling $p(R_C|S, E_0)$ that are divided into the following implicit and explicit models: (1) Sequence-Level Explicit Encoder Model, (2) Sequence-Level Explicit Decoder Model, (3) Word-Level Implicit Model, and (4) Word-Level Explicit Model.

Sequence-Level Explicit Encoder Model (SEE): Referring to FIG. 3, in order to explicitly generate responses with emotion, SEE includes emotion embedding $e_{SEE}$ 354 at encoder 352. Encoder 352 is fed with $S' = (e_{SEE}, s_1, s_2, \ldots, s_{|S|})$, where $(e_{SEE} = A_{SEE} E_0$ is an emotion embedding ($e_{SEE} \in \mathbb{R}^3$), and $A_{SEE} \in \mathbb{R}^{3 \times 6}$ is a mapping (learned during training) from $E_0$ into an emotion embedding space.

Sequence-Level Explicit Decoder Model (SED): Another way of forcing an emotional output is to explicitly indicate $E_0$ at every decoding step. According to this approach, in addition to other inputs, an emotion embedding $e_{SED}$ 362 is provided at each step of decoder 360. Formally, the GRU hidden state at time t is calculated as $h_t = f(h_{t-1}, r'_t)$ with $r'_t = [r_{t-1}; e_{SED}]$, where $e_{SED}$ is defined equivalently to $e_{SEE}$. It is noted, however, that $A_{SEE}$ and $A_{SED}$ are different, which implies that the emotion embedding spaces they map are also different. The present approach advantageously enables the target emotion, $E_0$, to be provided in a continuous space.

Word-Level Implicit Model (WI): To model the word-level emotion carried by each dialog sequence, an Affective Regularizer (AR) is used, which expresses the affective distance between training $R_{final}$ and training $R_0$, in the VAD space. The AR forces seq2seq architecture 150/250/350 to prefer words in the vocabulary that carry emotions in terms of VAD. Formally, the conventional Negative Log Likelihood (NLL) loss is additively combined with a novel and inventive affective regularizer loss term $\mathcal{L}_{AR}$ as:

$$\mathcal{L} = \mathcal{L}_{NLL} + \mathcal{L}_{AR} = -\log p(R_{final}|S) + \mu \mathcal{L}_{VAD}(R_{final}, R_0) \quad \text{(Equation 6)}$$

-continued $$\mathcal{L}_{VAD}(R_{final}, R_0) = \left\| \sum_{t=1}^{|R_{final}|} \frac{E^{VAD} s_t}{|R_{final}|} - \sum_{t=1}^{|R_0|} \frac{e_{r_{0_t}}^{VAD}}{|R_0|} \right\|, \quad \text{(Equation 7)}$$

where $s_t$=softmax($h_t$)($s_t \in \mathbb{R}^{|V|}$) is a confidence of the system of generating words $w_1, \ldots, w_{|V|}$ at time t and $\mu \in \mathbb{R}$. $e_x^{VAD} \in \mathbb{R}^3$ is a 3D vector representing emotion associated with a word x in VAD space (note that $e_x^{VAD}$ is constant with respect to t), and $E^{VAD} \in \mathbb{R}^{3 \times |V|}$ is a matrix containing $e_{w_V}^{VAD}$ for all |V| words in the vocabulary:

$$E^{VAD} = [e_{w_1}^{VAD}; \ldots; e_{w_{|V|}}^{VAD}] \quad \text{(Equation 8)}$$

The affective regularizer term $\mathcal{L}_{AR}$ penalizes the deviation of the emotional content of the final response $R_{final}$ generated during training from that of target dialog response $R_0$ 240. It is noted that the emotional information carried by $R_{final}$ is the weighted sum of emotion representations $e_{w_i}^{VAD}$ for all words in the vocabulary, where the weights are determined by the confidence $s_t$.

Thus, seq2seq architecture 150/250/350 is trained using the loss function given by Equation 6 having affective regularizer term $\mathcal{L}_{AR}$ based on a difference in emotional content between target dialog response $R_0$ 240 and dialog sequence $R_{final}$ determined by seq2seq architecture 150/250/350 during training. Moreover, affective regularizer term $\mathcal{L}_{AR}$ corresponds to the distance between target dialog response $R_0$ 240 and dialog sequence $R_{final}$ determined by seq2seq architecture 150/250/350 during training, in VAD space.

Word-Level Explicit Model (WE): Sequential word generation allows sampling of the next word based on the emotional content of the current incomplete sentence. If some words in a dialog sequence do not express the target emotion $E_0$, other words can compensate for that by changing the final affective content significantly. For example, in the sentence "I think that the cat really loves me?", the first six words are neutral, while the end of the sentence makes it clearly express joy. Such a phenomenon may be captured during training by using an Adaptive Affective Sampling Method:

$$\log p(R_C|S, E_0) = \sum_{t=1}^{|R_C|} \log p(r_t|r_{<t}, e_{r_{<t}}, h_s, E_0) \quad \text{(Equation 9)}$$

where:

$$p(r_t|r_{<t}, e_{r_{<t}}, h_s, E_0) = \lambda \text{softmax } g(h_t) + (1-\lambda)\text{softmax } v(E_t^{VAD}). \quad \text{(Equation 10)}$$

Here, $g(h_t)$ is defined as in Equation 3, and $0 \leq \lambda \leq 1$ is learned during training. The first term in Equation 10 is responsible for generating words according to a language model preserving grammatical correctness of the sequence, while the second term forces generation of words carrying emotionally relevant content. $E_t^{VAD} \in \mathbb{R}^3$ is a vector representing the remaining emotional content needed to match a goal ($E_0^{VAD}$) after generating all words up to time t. It is updated every time a new word $r_t$ with an associated emotion vector $e_{r_t}^{VAD}$ is generated:

$$E_t^{VAD} = E_{t-1}^{VAD} - e_{r_{t-1}}^{VAD} \quad \text{(Equation 11)}$$

$$E_0^{VAD} = \begin{cases} \sum_{t=1}^{|R_0|} e_{r_{t-1}}^{VAD}, & \text{during training} \\ M_{VAD} E_0 \cdot \max_{length}, & \text{after training} \end{cases}$$

where $e_{r_{0_t}}^{VAD}$ is an emotion vector associated with words $r_{0_t}$ in target dialog response $R_0$ 240, $\max_{length}$ is a maximum length set for the sequence-to-sequence model, and $M_{VAD} \in \mathbb{R}^{3 \times 6}$ is a mapping from six-dimensional emotion space into VAD space (every emotion has a VAD vector as introduced by Hoffmann et al. and known in the art, scaled to a range [0, 1]):

$$M_{VAD} = \begin{bmatrix} \text{anger} & \text{surprise} & \text{joy} & \text{sadness} & \text{fear} & \text{disgust} \\ 0 & 1 & 1 & 0 & 0 & 1 \\ 1 & 1 & 1 & 0 & 1 & 0.5 \\ 1 & 0 & 1 & 0 & 0 & 0.5 \end{bmatrix} \begin{matrix} V \\ A \\ D \end{matrix} \quad \text{(Equation 12)}$$

The expression $v(E_t^{VAD})$ defines a vector whose i-th component measures the potential remaining emotional content of the sequence in the case of choosing the i-th word $w_i$:

$$v(E_t^{VAD}) = - \begin{bmatrix} \|E_t^{VAD} - e_{w_0}\| \\ \ldots \\ \|E_t^{VAD} - e_{w_{|V|}}\| \end{bmatrix} \quad \text{(Equation 13)}$$

In one implementation, the parameter $\lambda$ is set equal to one, i.e., $\lambda=1$, after generating the first $\max_{length}/2$ words. This setting for $\lambda$ has been found to ensure that the first generated words carry the correct emotional content, while preserving the grammatical correctness of the dialog response as a whole.

Referring once again to FIG. 4 in combination with FIGS. 1, 2, and 3, after training of seq2seq architecture 150/250/350 has been completed, flowchart 480 continues with receiving input dialog sequence S 130/230/330 (action 482). By way of example, and as noted above, in one implementation, user 120 may utilize computing platform 102 to interact with non-human conversational agent 108 supported by software code 110/210 including seq2seq architecture 150/250/350. As further noted above, conversational agent 108 may be utilized to animate a virtual character, such as an avatar, or a machine, such as a robot, for example, so as to enable that virtual character or machine to engage in an extended social interaction with user 120.

Thus, as shown in FIG. 1, in some implementations, input dialog sequence S 130/230/330 may be received from conversational agent 108 as a result of interaction by conversational agent 108 with user 120. Alternatively, input dialog sequence S 130/230/330 may be received from a third party source, or may be stored in system memory 106. Input dialog sequence S 130/230/330 may be received by software code 110/210 including seq2seq architecture 150/250/350, executed by hardware processor 104.

Flowchart 480 continues with using seq2seq architecture 150/250/350 to generate multiple emotionally diverse dialog responses $R_C$ to input dialog sequence S 130/230/330 based on input dialog sequence S 130/230/330 and predetermined target emotion $E_0$ 132/232/332 (action 483). In some implementations it has been found to be advantageous or desirable to generate a number "B" of emotionally diverse, grammatically correct, dialog responses $R_C$ for subsequent re-ranking based on their emotional relevance to input dialog sequence S 130/230/330. For example, a list of B emotionally diverse and grammatically correct dialog responses $R_C$ may be generated using Beam Search of size B with length normalization.

Generation of the multiple emotionally diverse dialog responses $R_C$ to input dialog sequence S 130/230/330 based on input dialog sequence S 130/230/330 and predetermined target emotion $E_0$ 132/232/332 may be performed by software code 110/210, executed by hardware processor 104, and using seq2seq architecture 150/250/350. For example, action 483 may be performed using the following objective function:

$$R_{final} = \text{argmax}_{R_C} p(R_C|S, E_0) + \alpha p(S|R_C) + \beta |R_C| - \gamma \|E_{R_C} - E_0\|, \quad \text{(Equation 14)}$$

It is noted that the weighting factors $\alpha$ and $\beta$ applied to the second and third terms on the right in Equation 14 are optimized to ensure grammatical correctness and emotional diversity, respectively. The weighting factors $\alpha$ and $\oplus$ may be optimized using grid search, for example. In one implementation, $\alpha$ may be equal to approximately fifty ($\alpha \cong 50.0$), for example. In one implementation, $\beta$ may be equal to approximately 0.001 ($\beta \cong 0.001$), for example. It is noted that the weighting factor $\gamma$ may be initially set to zero while values for $\alpha$ and $\beta$ are determined.

Flowchart 480 continues with using seq2seq architecture 150/250/350 to determine final dialog sequence $R_{final}$ 134/234/334 responsive to input dialog sequence S 130/230/330 based on the emotional relevance of each of the multiple emotionally diverse dialog responses $R_C$ to input dialog sequence S 130/230/330 generated in action 483 (action 484). Final dialog sequence $R_{final}$ 134/234/334 may be determined by software code 120/220, executed by hardware processor 104, and using affective re-ranking stage 370 of seq2seq architecture 150/250/350 and the last term of Equation 14.

The last term of Equation 14, i.e., $-\gamma\|E_{R_C} - E_0\|$, penalizes the difference between the emotional content $E_{R_C}$ of the each of the multiple emotionally diverse dialog responses $R_C$ and the predetermined target emotion $E_0$. In some implementations, the weighting factor $\gamma$ for the last term of Equation 14 may be determined based on training input 144/244 received from one or more human annotators 122.

According to some implementations, for example, dialog sequence or sequences 128/228 determined using seq2seq architecture 150/250/350 during training are transmitted to one or more annotators 122 for evaluation. In one implementation, one or more annotators 122 may each utilize the AffectButton, introduced by Broekens and Brinkman and known in the art, for assigning emotions. In one implementation, the AffectButton lets one or more annotators 122 choose a facial expression from a continuous space that best matches the emotional state associated with dialog sequence 128/228. That facial expression is received by software code 110/210 of affect-driven dialog generation system 100, when executed by hardware processor 104, and is then mapped into VAD space.

Thereafter, determination of weighting factor $\gamma$ may be performed by software code 110/210 based on training input 144/244. In some implementations, for example, y may be greater than one (y>1.0). In one implementation, $\gamma$ may be approximately equal to 4.2 (y=4.2).

Flowchart 480 can conclude with providing final dialog sequence $R_{final}$ 134/234/334 as an output for responding to input dialog sequence S 130/230/330 (action 485). Final dialog sequence $R_{final}$ 134/234/334 may be output by software code 110/210, executed by hardware processor 104. In implementations in which software code 110/210 including seq2seq architecture 150/250/350 is used to support interactions by non-human conversational agent 108 with a human user, such as user 120, action 485 may result in final dialog sequence $R_{final}$ 134/234/334 being output to non-human conversational agent 108 for rendering by non-human conversational agent 108.

As further noted above, conversational agent 108 may be utilized to animate a virtual character, such as an avatar, or a machine, such as a robot, for example, so as to enable that virtual character or machine to engage in an extended social interaction with user 120. For example, and as discussed above, in some implementations, final dialog sequence $R_{final}$ 134/234/334 may be rendered by non-human conversational agent 108 as text on display 118 or may be rendered as verbal communications by a machine such as a robot, or by a virtual character rendered on display 118.

Thus, the present application discloses affect-driven dialog generation systems and methods. By utilizing a loss function having an affective regularizer term based on the difference in emotional content between a target dialog response and a dialog sequence determined by an seq2seq architecture, to train the seq2seq architecture, the present solution enables the generation of multiple, emotionally diverse dialog responses to an input dialog sequence. In addition, by determining a final dialog sequence from among the emotionally diverse dialog responses based on their emotional relevance to the input dialog sequence, the present solution can advantageously provide a socially intelligent and appropriate response to the input dialog sequence. As a result, the present application discloses an affect-driven dialog generation solution capable of expressing emotion in a controlled manner, without sacrificing grammatical correctness or logical coherence.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An affect-driven dialog generation system comprising:
a computing platform including a hardware processor and a system memory;
a software code stored in the system memory, the software code including a sequence-to- sequence (seq2seq) architecture trained using a loss function having an affective regularizer term based on a difference in an emotional content between a target dialog response and a dialog sequence determined by the seq2seq architecture during training;
the hardware processor configured to execute the software code to:
receive an input dialog sequence;
generate, using the seq2seq architecture, a plurality of emotionally diverse dialog responses to the input dialog sequence based on the input dialog sequence and a predetermined target emotion;

determine, using the seq2seq architecture, a final dialog sequence responsive to the input dialog sequence based on an emotional relevance of each of the plurality of emotionally diverse dialog responses to the input dialog sequence; and provide the final dialog sequence as an output for responding to the input dialog sequence.

2. The affect-driven dialog generation system of claim 1, wherein the emotional relevance of each of the plurality of emotionally diverse dialog responses to the input dialog sequence is determined using an objective function applied to each of the plurality of emotionally diverse dialog responses, the objective function including a term penalizing a difference between an emotional content of the each of the plurality of emotionally diverse dialog responses and the predetermined target emotion.

3. The affect-driven dialog generation system of claim 2, wherein the term penalizing the difference between the emotional content of the each of the plurality of emotionally diverse dialog responses and the predetermined target emotion is weighted using a weighting factor determined based on a training input received from at least one human annotator of the dialog sequence determined by the seq2seq architecture during training.

4. The affect-driven dialog generation system of claim 3, wherein the weighting factor is greater than one.

5. The affect-driven dialog generation system of claim 1, further comprising a non-human conversational agent, wherein the non-human conversational agent is configured to render the final dialog sequence.

6. The affect-driven dialog generation system of claim 1, wherein the seq2seq architecture includes an encoder implemented using a recurrent neural network (RNN), a decoder implemented using another RNN, and an affective re-ranking stage configured to determine the emotional relevance of each of the plurality of emotionally diverse dialog responses to the input dialog sequence.

7. The affect-driven dialog generation system of claim 1, wherein the affective regularizer term of the loss function corresponds to a distance between the target dialog response and the dialog sequence determined by the seq2seq architecture during training in a Valence-Arousal-Dominance (VAD) space.

8. A method for use by an affect-driven dialog generation system including a computing platform having a hardware processor and a system memory storing a software code including a sequence-to-sequence (seq2seq) architecture trained using a loss function having an affective regularizer term based on a difference in an emotional content between a target dialog response and a dialog sequence determined by the seq2seq architecture during training, the method comprising:

receiving, using the hardware processor, an input dialog sequence;

generating, using the hardware processor and the seq2seq architecture, a plurality of emotionally diverse dialog responses to the input dialog sequence based on the input dialog sequence and a predetermined target emotion;

determining, using the hardware processor and the seq2seq architecture, a final dialog sequence responsive to the input dialog sequence based on an emotional relevance of each of the plurality of emotionally diverse dialog responses to the input dialog sequence; and providing, using the hardware processor, the final dialog sequence as an output for responding to the input dialog sequence.

9. The method of claim 8, wherein the emotional relevance of each of the plurality of emotionally diverse dialog responses to the input dialog sequence is determined using an objective function applied to each of the plurality of emotionally diverse dialog responses, the objective function including a term penalizing a difference between an emotional content of the each of the plurality of emotionally diverse dialog responses and the predetermined target emotion.

10. The method of claim 9, wherein the term penalizing the difference between the emotional content of the each of the plurality of emotionally diverse dialog based on a training input received from at least one human annotator of the dialog sequence determined by the seq2seq architecture during training.

11. The method of claim 10, wherein the weighting factor is greater than one.

12. The method of claim 8, wherein the affect-driven dialog generation system further comprises a non-human conversational agent, and wherein the method further comprises rendering, using the non-human conversational agent, the final dialog sequence.

13. The method of claim 8, wherein the seq2seq architecture includes an encoder implemented using a recurrent neural network (RNN), a decoder implemented using another RNN, and an affective re-ranking stage, and wherein determining the emotional relevance of each of the plurality of emotionally diverse dialog responses to the input dialog sequence is performed using the affective re-ranking stage of the seq2seq architecture.

14. The method of claim 8, wherein the affective regularizer term of the loss function corresponds to a distance between the target dialog response and the dialog sequence determined by the seq2seq architecture during training in a Valence-Arousal- Dominance (VAD) space.

15. A computer-readable non-transitory medium having stored thereon a software code including instructions, which when executed by a hardware processor, instantiate a method comprising:

receiving an input dialog sequence;

generating a plurality of emotionally diverse dialog responses to the input dialog sequence based on the input dialog sequence and a predetermined target emotion using a sequence-to-sequence (seq2seq) architecture trained using a loss function having an affective regularizer term based on a difference in an emotional content between a target dialog response and a dialog sequence determined by the seq2seq architecture during training;

determining, using the seq2seq architecture, a final dialog sequence responsive to the input dialog sequence based on an emotional relevance of each of the plurality of emotionally diverse dialog responses to the input dialog sequence; and providing the final dialog sequence as an output for responding to the input dialog sequence.

16. The computer-readable non-transitory medium of claim 15, wherein the emotional relevance of each of the plurality of emotionally diverse dialog responses to the input dialog sequence is determined using an objective function applied to each of the plurality of emotionally diverse dialog responses, the objective function including a term penalizing a difference between an emotional content of the each of the plurality of emotionally diverse dialog responses and the predetermined target emotion.

17. The computer-readable non-transitory medium of claim 16, wherein the term penalizing the difference between the emotional content of the each of the plurality of emotionally diverse dialog responses and the predetermined target emotion is weighted using a weighting factor determined based on a training input received from at least one human annotator of the dialog sequence determined by the seq2seq architecture during training.

18. The computer-readable non-transitory medium of claim 17, wherein the weighting factor is greater than one.

19. The computer-readable non-transitory medium of claim 15, wherein the seq2seq architecture includes an encoder implemented using a recurrent neural network (RNN), a decoder implemented using another RNN, and an affective re-ranking stage, and wherein determining the emotional relevance of each of the plurality of emotionally diverse dialog responses to the input dialog sequence is performed using the affective re-ranking stage of the seq2seq architecture.

20. The computer-readable non-transitory medium of claim 15, wherein the affective regularizer term of the loss function corresponds to a distance between the target dialog response and the dialog sequence determined by the seq2seq architecture during training in a Valence-Arousal-Dominance (VAD) space.

* * * * *

UNITED STATES PATENT AND TRADEMARK OFFICE
CERTIFICATE OF CORRECTION

PATENT NO. : 10,818,312 B2  
APPLICATION NO. : 16/226166  
DATED : October 27, 2020  
INVENTOR(S) : Modi et al.

Page 1 of 1

It is certified that error appears in the above-identified patent and that said Letters Patent is hereby corrected as shown below:

In the Claims

Column 12, Line 15 – 18, Claim 10, "the plurality of emotionally diverse dialog based on a training input received from at least one human annotator of the dialog sequence determined by the seq2seq architecture during training" should be -- the plurality of emotionally diverse dialog responses and the predetermined target emotion is weighted using a weighting factor determined based on a training input received from at least one human annotator of the dialog sequence determined by the seq2seq architecture during training --

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*